(12) United States Patent
Gale

(10) Patent No.: X4593
(45) Date of Patent: Dec. 7, 1826

(54) SPOONS, MANUFACTURING

(76) Inventor: William Gale described, together with the application of this principle either to a double or
single piston engine, is what your petitioner claims as his invention.
Witnesses
Alexander Barton
A. Hatheway
George Deming
[illegible]
(1243 words)
Exd [illegible]

William Gale Patented December 7th 1826.
The Schedule referred to in these Letters Patent
& making part of the same, containing a des-
cription in the words of the said William Gale
himself of his improvement in the manufacture
of Silver Spoons, and forks, with or without ornaments.
To all persons to whom these presents shall come
William Gale of the City, County & State of New-
York, Silver Smith, Sends Greeting. Be it known
that I the said William Gale have invented made
and applied to use a new & useful improvement
in making or manufacturing Silver Spoons and
Silver forks, which improvement is in the words
& figures following, to wit— The machine consists
of two steel rollers of two & a half inches in circum-
ference and four & a half inches in long they these
rollers are placed one above the other in the same
manner that rollers used by Silver Smiths generally
are; they are usually denominated rolling mills,
(see letters A and B on figures 1 of the drawing annex.
Transversely on these rollers is a die sunk one
for the upper & one for the under side of the
spoon & fork see letters C and D on figure 1. of
the drawing annexed. These dies are sunk in the
rollers so that ornaments in bass relief are made
the whole lenth of the handle of the fork & spoon
as represented in figure 2 & 3. - Another die is sunk as shewn by letter B. on one of the rollers only to make a spoon perfectly plain These rollers are placed in wrought or cast iron frames, and work in the same manner with common rollers as represented in figure 1. In the top of the frame screws are placed to regulate the rollers. These rollers may be turned by hand, horse, or steam power; the one now used by me is turned by hand with crosses — The silver must be prepared to the suitable size & thickness, and applied to the side of the rollers so as to come in contact with & be received by the ends of the dies in their revolution & is received on the other side in the flat form of the spoon or fork.

The ornaments are perfectly formed in bass relief — The spoon then requires only to be shaped, the bowl to be formed and fine polished. — The silver for the fork must be prepared in the same way and applied in the same manner, and is in this way perfectly made, requiring only to be shaped & fine polished. — I intend to apply this principle or improvement to the making of all kinds of silver spoons & forks, to any and every form and pattern...

Witnesses
James R. Whiting
Thomas R. Ludlam

William Gale

Engd
W.H.